US006564218B1

(12) United States Patent
Roth

(10) Patent No.: US 6,564,218 B1
(45) Date of Patent: May 13, 2003

(54) METHOD OF CHECKING THE VALIDITY OF A SET OF DIGITAL INFORMATION, AND A METHOD AND AN APPARATUS FOR RETRIEVING DIGITAL INFORMATION FROM AN INFORMATION SOURCE

(75) Inventor: Martin Josef Roth, Holte (DK)

(73) Assignee: Premitech ApS (DK)

( * ) Notice: Subject to any disclaimer, the term of this patent is extended or adjusted under 35 U.S.C. 154(b) by 0 days.

(21) Appl. No.: 09/439,806

(22) Filed: Nov. 12, 1999

(51) Int. Cl.$^7$ .............................. G06F 17/30; G06F 7/00
(52) U.S. Cl. ................................ 707/10; 707/1; 707/2; 707/9; 707/104.1
(58) Field of Search .................... 707/1–10, 100–104.1, 707/200–206, 500–542; 714/400, 1–57, 699–824; 709/248

(56) References Cited

U.S. PATENT DOCUMENTS

| | | | | |
|---|---|---|---|---|
| 4,714,992 A | | 12/1987 | Gladney et al. ............ 364/200 |
| 5,842,216 A | | 11/1998 | Anderson et al. ........... 707/203 |
| 5,892,914 A | | 4/1999 | Pitts ....................... 395/200.49 |
| 5,893,117 A | | 4/1999 | Wang ......................... 707/203 |
| 5,974,238 A | * | 10/1999 | Chase, Jr. .................... 709/248 |
| 5,999,947 A | * | 12/1999 | Zollinger et al. ........... 707/203 |
| 6,219,676 B1 | * | 4/2001 | Reiner ........................ 707/201 |
| 6,256,713 B1 | * | 7/2001 | Audityan et al. ........... 711/141 |
| 6,295,541 B1 | * | 9/2001 | Bodnar et al. .............. 707/203 |

FOREIGN PATENT DOCUMENTS

| | | | |
|---|---|---|---|
| EP | 0 714 066 A2 | 5/1996 | ........... G06F/12/08 |
| WO | 97/21177 | 6/1997 | ........... G06F/17/30 |

OTHER PUBLICATIONS

International Search Report for PA 1999 10632/C4/CJ p. 1–4.
Dingle, et al, "Web cache coherence", *Computer Networks and ISDN Systems*, May 5, 1996 p. 907–920.
Mummert, et al, "Large Granularity Cache Coherence for Intermittent Connectivity," *USENIX Summer Conference*, Jun. 6, 1994. p. 279–289.

* cited by examiner

*Primary Examiner*—Greta Robinson
*Assistant Examiner*—Linh Black
(74) *Attorney, Agent, or Firm*—Altera Law Group LLC

(57) ABSTRACT

The invention disclosed herein is a method of checking the validity of a set of digital information contained in an information cache connected to an information source. The method includes specifying two or more overlapping supersets of information having the set of digital information as a common subset; and performing the validity check of the set of digital information by comparing validity information associated with one or more of the supersets in the cache and validity information associated with corresponding supersets in the information source. Disclosed herein is a method of and apparatus for retrieving digital information from an information source having a cache connected thereto.

12 Claims, 8 Drawing Sheets where i = 1, 2, 3, ...

METHOD OF CHECKING THE VALIDITY OF A SET OF DIGITAL INFORMATION, AND A METHOD AND AN APPARATUS FOR RETRIEVING DIGITAL INFORMATION FROM AN INFORMATION SOURCE

The present invention relates to a method of checking the validity of a set of digital information contained in cache means connected to an information source by comparing validity information associated with said set of digital information and validity information associated with corresponding digital information in said information source.

The invention also relates to a method of and an apparatus for retrieving digital information from an information source having cache means connected thereto.

Retrieving digital information from an information source, e.g. one or more databases, is widespread and already used by most companies deploying information technology equipment, e.g. in client-server systems connecting users to databases. Typically, the users request information regarding customers, products, logistics, economy or other subjects. Also the emerging e-trade solutions are based on customers client nodes connected to database servers via the Internet.

When a client retrieves data from an information source or remote databases the speed at which digital information or data are fetched is given by a number of parameters. Cached data that are located in close proximity to the client will be fetched fast because they do not have to travel a long way on a crowded network. Data that must be fetched from a remote database will have to be retrieved from the database disk and managed by the database server CPU. Thus the main parameters are distance, network bandwidth, database-server capability and database storage media access speed.

Client-server communication is often implemented in a not very optimal way as the software used is often designed for maximum functionality and flexibility, not necessarily optimum performance. Many tools will supply the requested information, yet at the same time consume substantial resources on the computers involved (CPU, network, etc.), e.g. many tools will start a new process to serve a user request.

The usual method in order to avoid requesting the same data twice is a cache. A cache is generally a temporary storage of information nearer to the point of use than the original location. For example, in a web system data files from the web server are typically cached on the client; e.g. a price list or a map showing the supplier's address. This is a standard feature of most HTML (HyperText Markup Language) browsers. The next time the client needs the information, it is accessed faster because it can be read from the cache, e.g located on the client hard disk or in RAM, instead of having to be transferred across the network, e.g. the Internet.

One of the important issues of caching is the fact that the information stored in cache, e.g. on a client, will not automatically be updated upon server updates. Therefore, prior to retrieval of digital information located in a cache memory, a validity check has to be performed in order to determine whether the cached digital information is outdated or not. An implementation is described in patent application WO 97/21177. This document describes the use of time stamps on cache data and on index data in the database in order to perform the validity check. The validity check is performed by comparing a time stamp associated with a respective cache database entry and a time stamp associated with the index to the corresponding data entry in the master database. This document also describes different data locking methods to deal with real time update of data that is accessed by many clients.

Notifying the client that previously fetched data have been changed can also be performed by tracking the information on the server and sending notification about updated data to the client. Such a method is described in U.S. Pat. No. 4,714,992: "Communication for version management in a distributed information service". This patent describes a system with a updated master database and a replica database holding the same information as the master database. Only the master database is updated and valid at all times. When the replica database is going to be updated, the replica database sends a query to the master database for identifiers of obsolete records. This allows the replica database to redirect client queries for the obsolete data to the master database until the replica database has been updated.

The U.S. Pat. No. 5,842,216: "System for sending small positive data notification messages over a network to indicate that a recipient node should obtain a particular version of a particular data item" describes a system in which a small message is sent from the database server to the recipient notifying the recipient that data have been updated. The massage includes a time stamp, the data location and a check sum of the data held in that particular location. Based on the time stamp, the recipient can determine whether updated data should be fetched. Based on the location and the check sum, the recipient can look for the data in a local cache if a cache is available.

Version control at the query level is described in U.S. Pat. No. 5,892,914: "System for accessing distributed data cache at each network node to pass requests and data". This patent describes a method of connecting multiple servers each storing a fraction of a total cache, a Network Distributed Cache. When a client needs information, the client sends a query to one of the cache servers, and the query and the data held in that particular server are passed on to another server for completion. If all the requested data are fetched, the data are sent to the client. Otherwise, the query and the data are sent to the next cache server. This method results in a large number of version numbers, because the data object (e.g. a browser request from the client to the application server) is identified by all the parameters included in the request.

Considering a scenario where a query for products is made for a certain country, product group and date, the cache on the application server will have to contain data for all combinations of these parameters, a phenomenon that is known as tile Cartesian product. For 50 countries, 100 product categories and 100 dates the cache would contain 50*100*100=500,000 entries. Generally, N parameters and M values per parameter result in $M^N$ cache entries. This problem is inherent to all methods which identify a query result using a single version number.

Version control at the database level, as described in U.S. Pat. No. 5,893,117: "Time-stamped database transaction and version management system", deals with storing many versions of the same data entry, giving each entry a time stamp and building a data structure that allows the clients to track any version of a given data entry. The described system facilitates version control in a data base environment that is updated simultaneously by many users, e.g. software development projects where a number of developers write new codes for the same program. As a result, a large number of objects (records) has to be tracked For similar requests, e.g. querying a product price for different categories and different dates in the same country, the update status would have to be queried for every category and date.

Further, application specific programs have been developed, optimizing requests by caching data in program memory. This approach has two disadvantages: it requires the application program to be present on the client (and therefore application specific codes to be loaded, as an applet, through the network) and it increases program complexity and thus development time.

An object of the present invention is to provide a method of checking the validity of a set of digital information contained in cache means connected to an information source, as described in the introductory part in claim 1, which enables a more rapid and less memory requiring validity check compared to known methods.

According to the invention the object is achieved by a method of the above-mentioned type which is characterized by
specifying two or more overlapping supersets of information having said set of digital information as a common subset; and
performing said validity check by comparing validity information associated with one or more of said supersets in said cache means and validity information associated with corresponding supersets in said information source.

Hereby, as validity information is not related to the single items but relates to supersets typically containing a plurality of items or elements, the amount of validity information to be stored and maintained is reduced compared to the use of prior art methods. As a result, the amount of memory needed for storing validity information in said information source and in said cache means is reduced, i.e. the use of the memory is optimized as more digital information and corresponding validity information can be stored in a given amount of memory. As a consequence, the maintenance of the reduced amount of validity information can be performed rapidly. In addition, compared to known methods, when said set of digital information in said cache means includes a plurality of elements, a reduction of the validity information to be transferred between said information source and said cache means during a validity check, is reduced. Hereby, the information traffic between said information source and said cache means, e.g. via a relatively slow network, is reduced. Hence, the validity check can be performed rapidly compared to known methods.

An expedient embodiment of a method according to the invention is characterized in that said sot of digital information is identified as valid when at least one of said supersets is valid. This embodiment of the invention is based on the fact that said set of information can be determined to be valid when a single one of the corresponding supersets is found to be valid, because said set of digital information in said cache means is a common subset, i.e. an overlap or intersection of said supersets. As a consequence, the validity check can be stopped as soon as a single superset is determined to be valid and hereby the speed of the validity check is optimized. As two or more overlapping supersets have been specified, the chance of finding at least one superset indicating the information to be valid is increased.

Advantageously, said one or more supersets to be used for said validity check are selected from said specified supersets on the basis of a priori knowledge of supersets least likely to be updated. In another advantageous embodiment, said one or more supersets to be used for said validity check are selected from said specified supersets on the basis of obtained knowledge of supersets having been updated least frequently. Both of these embodiments are advantageous as the validity check can be based on supersets which will often be found to be valid, and as a consequence the information can rapidly be concluded to be valid. Preferably, the supersets are selected to be used in a prioritised order, i.e. a superset least likely to be updated is used first in said validity check.

As mentioned above, the invention also relates to a method of retrieving digital information from an information source having cache means connected thereto, said method comprising the steps of:
receiving a query specifying the digital information to be retrieved;
checking if said cache means holds query result information associated with said query, and in the affirmative performing a validity check of said query result information;
retrieving, if said cache means does not hold valid query result information associated with said query, valid query result information from said information source and updating said cache means with said retried valid query result information; and
presenting said valid query result information as a result of said query.

The method according to the invention is characterized in that said checking includes specifying two or more overlapping supersets of information having query result information associated with said query as a common subset; and said validity check is performed by comparing validity information associated with one or more of said supersets in said cache means and validity information associated with corresponding supersets in said information source.

Hereby, as mentioned above, the speed of the validity check may be improved because of the reduction of validity information for given query result information associated with said query which reduces the amount of validity information to be compared. The amount of validity information to be transmitted between said cache means and said information source in connection with validity checks and in connection with validity information updating in said cache means is reduced, resulting in a reduced load on the system. As a consequence, the overall speed of retrieval of digital information from the information source having cache means connected thereto is improved. By reducing the amount of validity information needed for a validity check, the memory required is also reduced.

An expedient embodiment of a method according to the invention is characterized in that query result information in a common subset is identified as valid when at least one of said supersets is valid. Hereby, the speed of the validity check is optimized as the validity check can be stopped, i.e. the information in said cache is found to be valid, as soon as a single superset is determined to be valid. As a consequence, the overall speed of retrieval of digital information from the information source having cache means connected thereto is improved.

Advantageously, said one or more supersets to be used for said validity check are selected from said specified supersets on the basis of a priori knowledge of supersets least likely to be updated. In another advantageous embodiment, said one or more supersets to be used for said validity check are selected from said specified supersets on the basis of obtained knowledge of supersets having been updated least frequently. These embodiments are advantageous as the validity check can be based on supersets which are often valid, and, as a consequence, the validity check can often be performed rapidly. As a consequence, the overall speed of retrieval of digital information from the information source having cache means connected thereto is improved even further.

Finally, the invention relates to an apparatus for retrieving digital information from an information source having cache means connected thereto, said apparatus comprising:

input means adapted to receive a query specifying the digital information to be retrieved;

checking means adapted to check if said cache means holds query result information associated with said query, and in the affirmative performing a validity check of said query result information;

updating means adapted, if said cache means does not hold valid query result information associated with said query, to retrieve valid query result information from said information source and to update said cache means with said retried valid query result information; and output means adapted to present said valid query result information as a result of said query.

The apparatus according to the invention is characterized in that said checking means is adapted to specify two or more overlapping supersets of information having query result information associated with said query as a common subset; and to perform said validity check by comparing validity information associated with one or more supersets in said cache means and validity information associated with corresponding supersets in said information source.

An expedient embodiment of an apparatus according to the invention is characterized in that said checking means is adapted to identify query result information in a common subset as valid when at least one of said supersets is valid.

Advantageously, said checking means is adapted to select said one or more supersets to be used for said validity check from said specified supersets on the basis of a priori knowledge of specified least likely to be updated. In another advantageous embodiment, said checking means is adapted to select said one or more supersets to be used for said validity check from said specified supersets on the basis of obtained knowledge of supersets having been updated least frequently.

It is noted that an apparatus according to the invention has the same advantages as mentioned in connection with the corresponding embodiments of the method.

The invention will be described more fully below in connection with a preferred embodiment and with reference to the drawings, in which.

Figure 3:
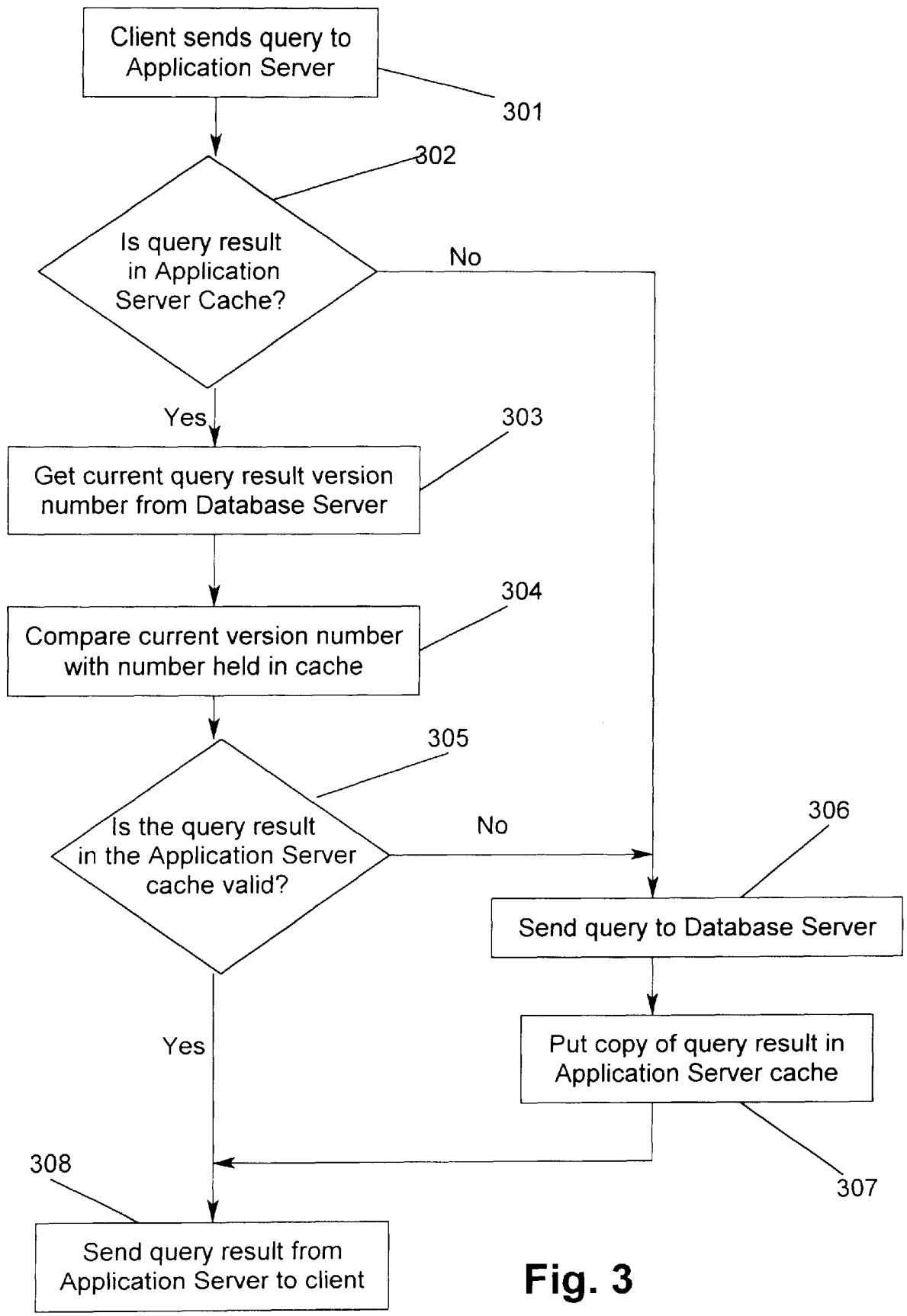
Figure 4:
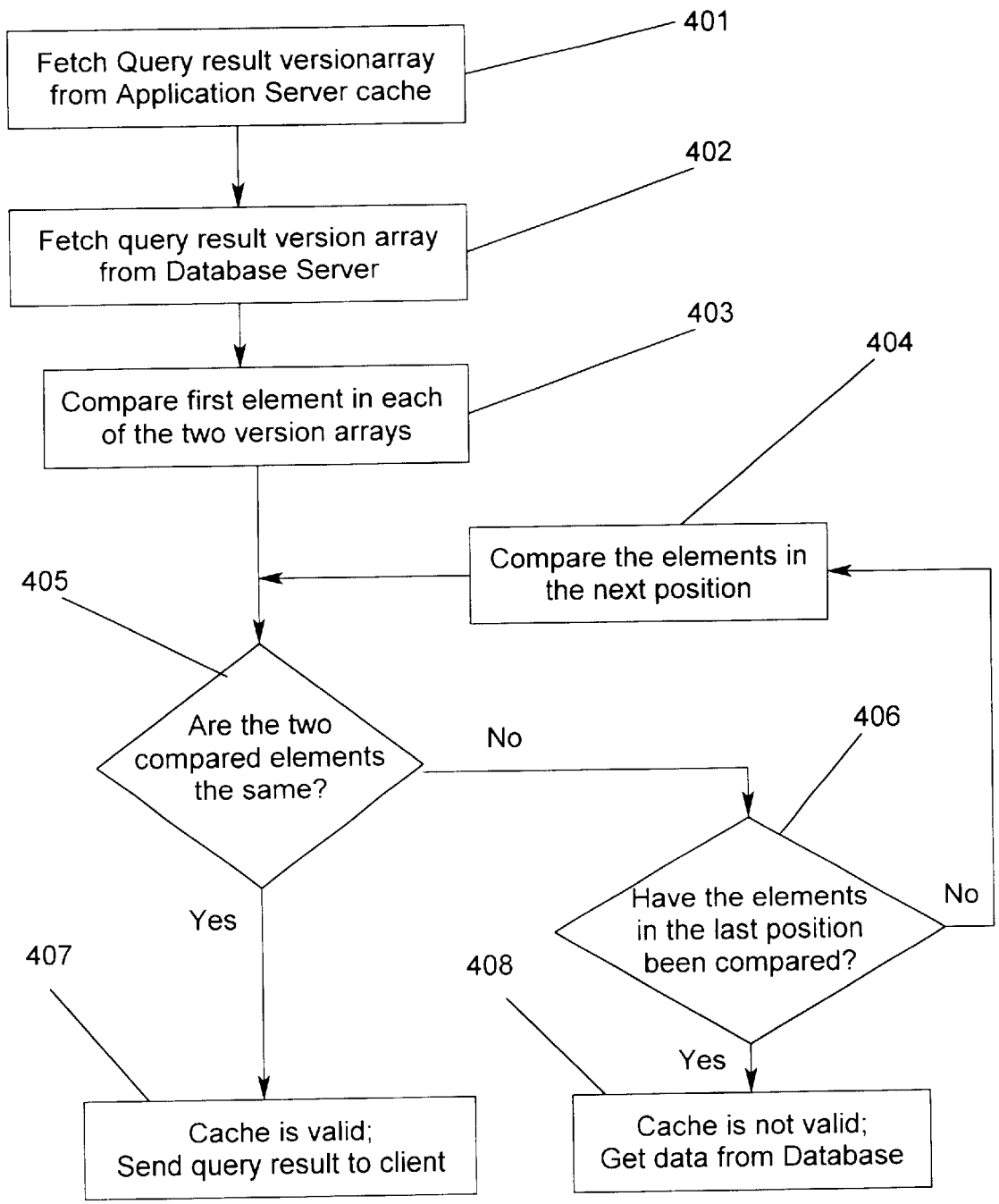
Figure 5:
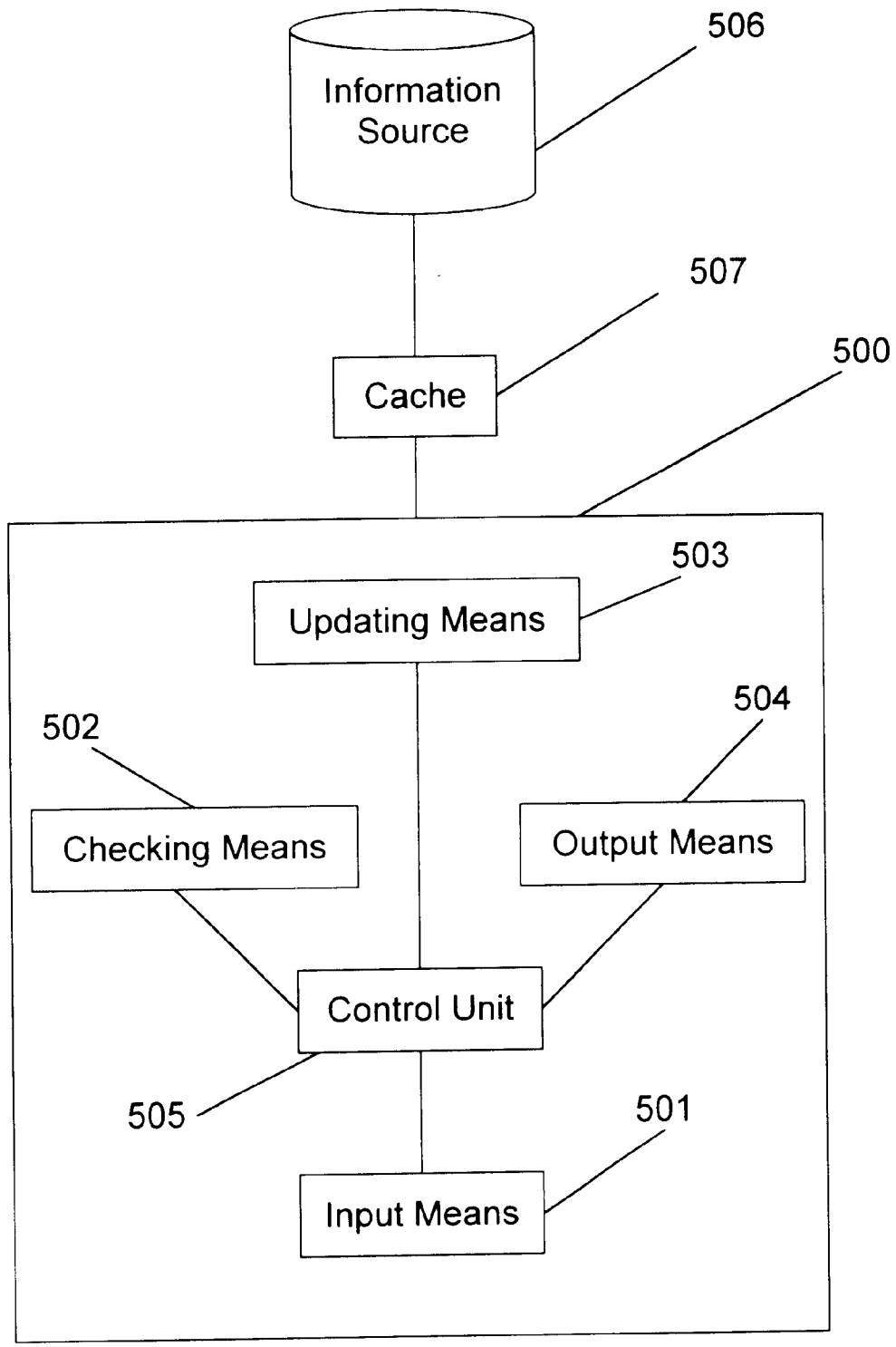
Figure 6A:
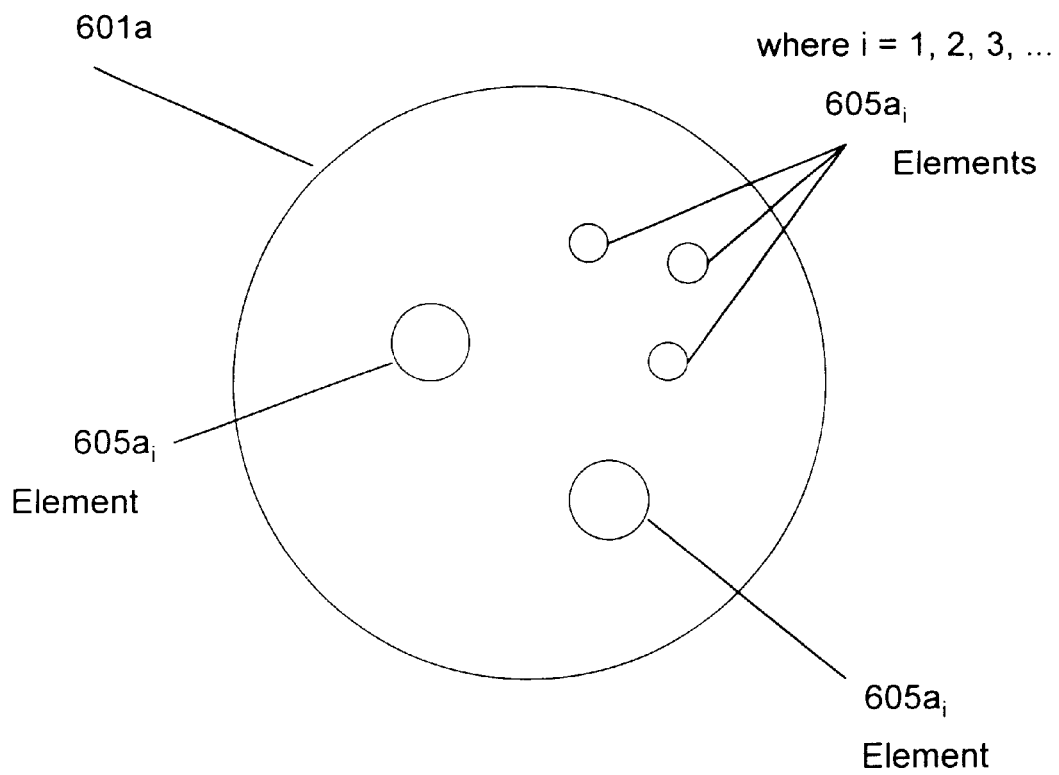
Figure 6B:
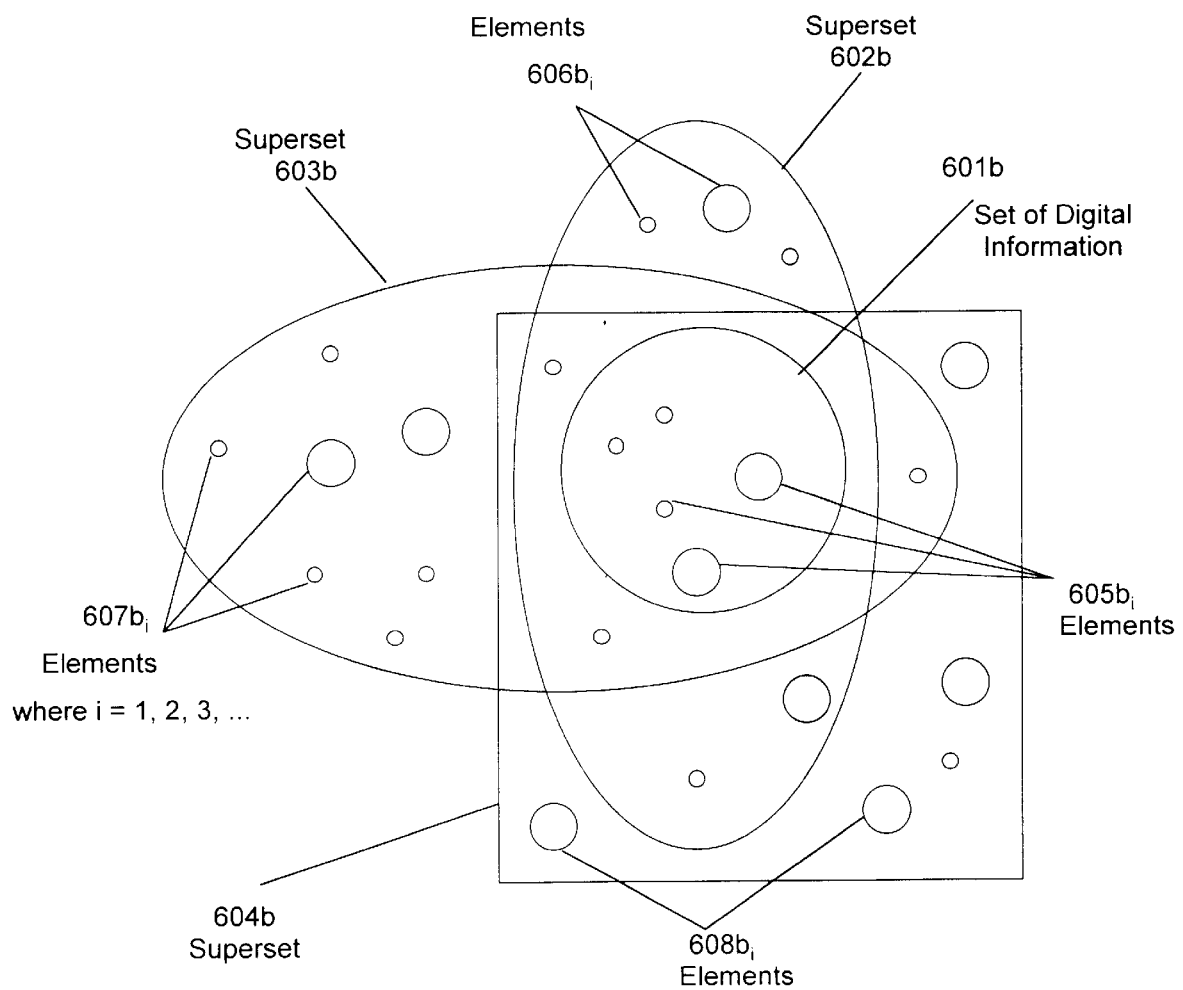

FIG. 3 is a flow chart of retrieving digital information from an information source having a cache connected thereto, FIG. 4 is a flow chart of performing a validity check of information in a cache connected to an information source, FIG. 5 is a block diagram of an apparatus for retrieving digital information from an information source having cache means connected thereto, FIG. 6A illustrates a set of digital information contained in a cache means connected to an information source, and FIG. 6B is an example of overlapping supersets having a given set of digital information as a common subset.

The figures are schematic and simplified for clarity, and they just show details which are essential to the understanding of the invention, while other details are left out. Throughout, the same reference numerals are used for identical or corresponding parts.

Figure 1:
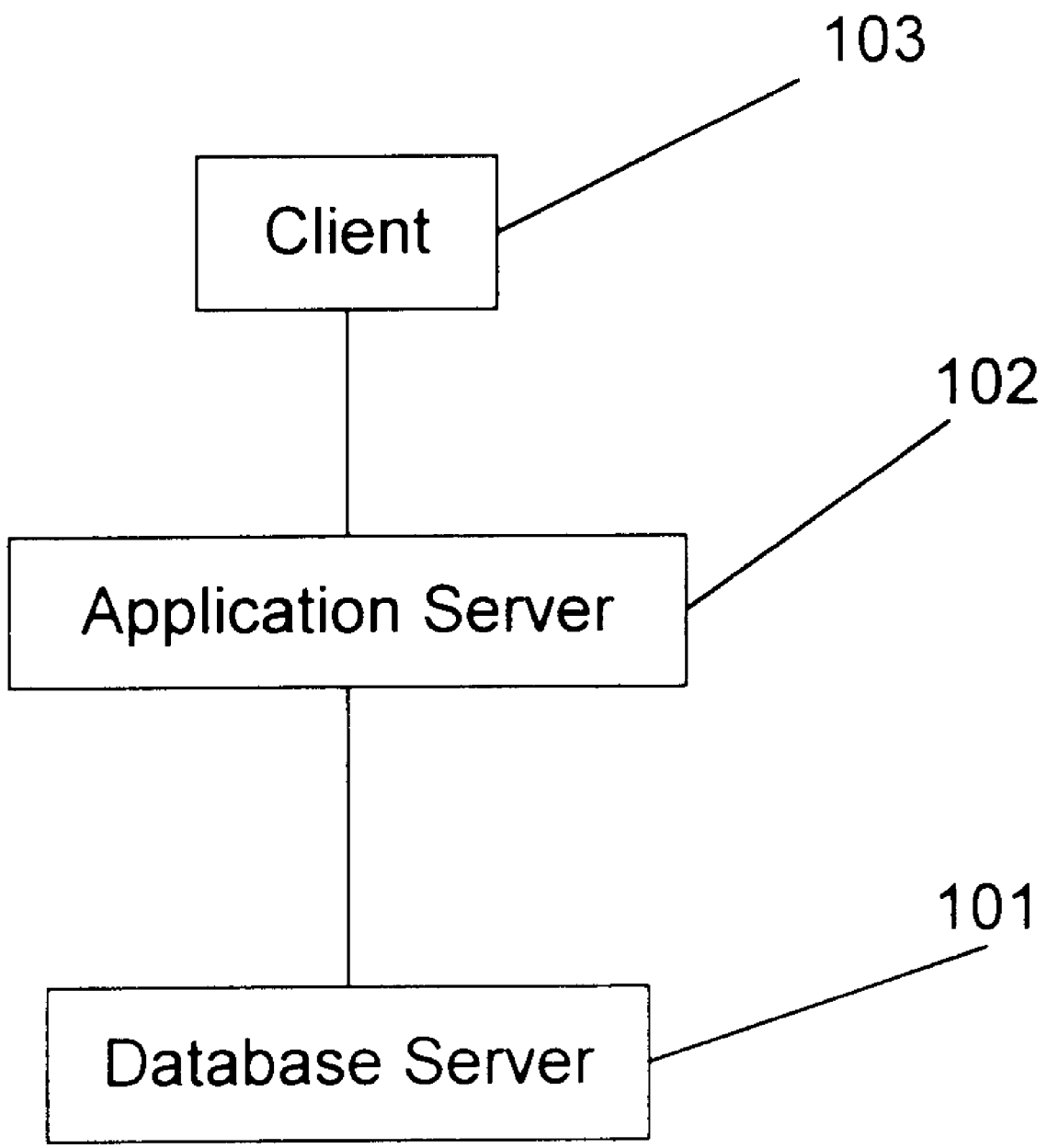
FIG. 1 shows a block diagram of a typical three tiered distributed system.

FIG. 1 is a block diagram of a typical three tiered distributed system in which a client node 103 is connected to a database server 101 through an application server 102. Hereby, the client node 103, which is just called the client 103 in the following, may retrieve digital information or data from the database server 101.

With reference to FIG. 1, the present invention describes a method for identifying changes in data that were previously transmitted from the database server 101 to the application server 102 and subsequently to the client 103. After data have been determined to be unchanged, a local cache will be used instead of requesting the data once more. This reduces the number of requests to the database server 101, as the database server 101 will not be involved in every single request. Likewise, it reduces the number of requests from the client to the application server 102. Instead of retrieving and sending the data from the database server 101 upon every request, the data are often either not transmitted to the client 103 at all, because the client determines that the data have not been changed since the client requested it the last time (client cache), or sent to the client 103 from the application server 102, because the application server 102 determines that the data have not been updated in the database, since the copy (cache) held on the application server 102 was retrieved (application server cache).

The client cache benefits only clients requesting the same data again. The application server cache benefits multiple clients, where the same data might only be requested from a specific client a single time, yet the same data are requested from multiple clients between updates on the database server.

In addition, this invention uses flexible database architecture to store information about the specifics of caching the information (a metadictionary).

Figure 2A:
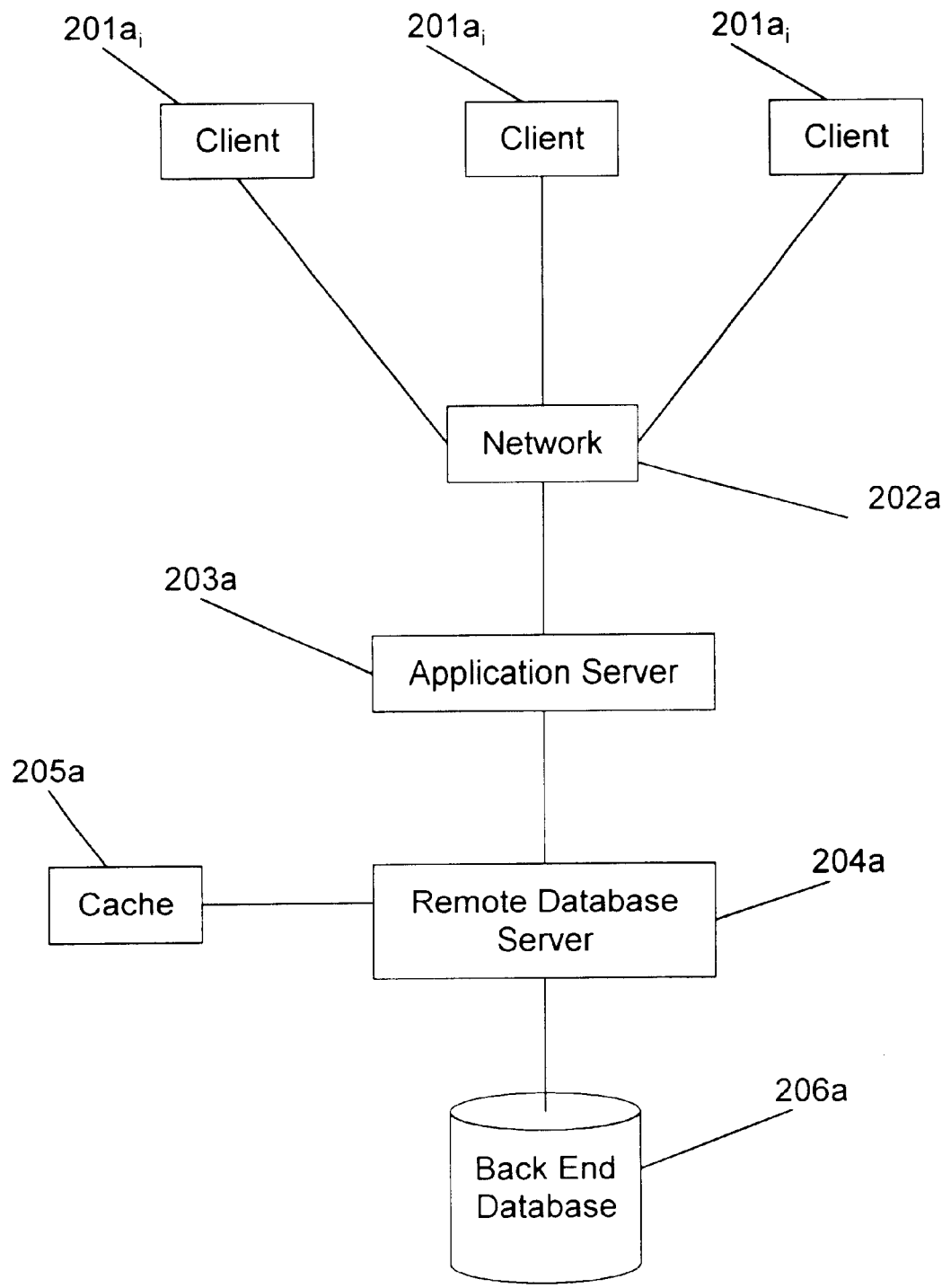
FIG. 2a illustrates a first example of a client-server system.
Figure 2B:
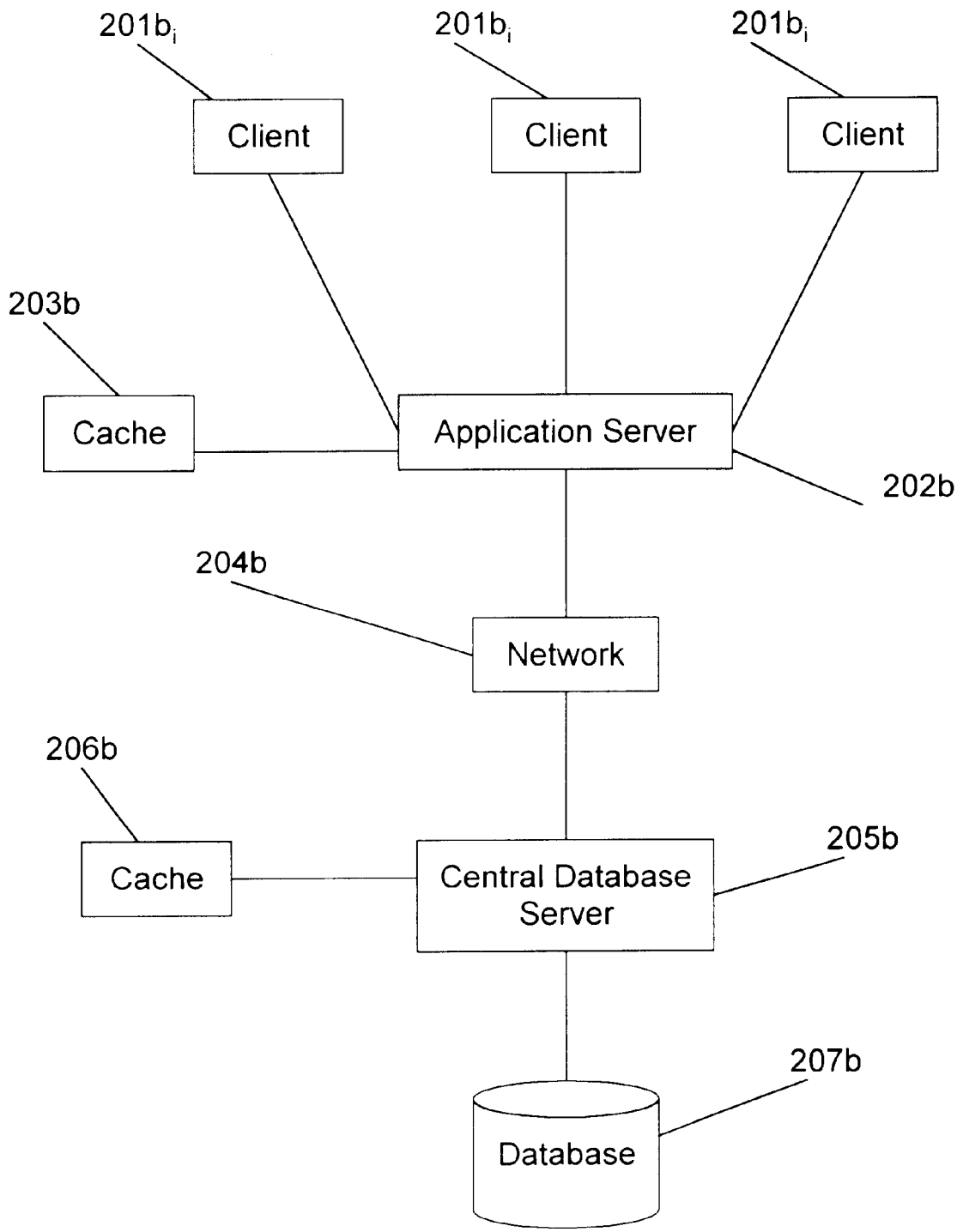
FIG. 2b illustrates a second example of a client-server system.

FIG. 2a is used in order to describe the data flow from a database to one or more clients via a network in a known system. The figure shows that a well-managed cache can reduce load on network and database back end. In traditional systems, FIG. 2a, the clients 201a fetch data from the back end database 206a via a network 202a, a remote application server 203a and a remote database server 204a. The remote database server 204a often includes a cache 205a. This set-up results in much traffic on the network 202a as well as a heavy load on the database server 204a. Many web service providers deal with this by installing a number of multi-CPU machines with load balancing to handle the database server task at a central point of service. With a well-managed distributed cache, FIG. 2b, the load on the network 204b and central database server 205b is not as heavy. Response time on each client 201b will also decrease when data can be fetched from a point close to the client. Tn FIG. 2b, when a client 201b asks for information in the database 207b, the application server will look for data in the local cache 203b before the query is sent via the network 204b to the database server 205b. In many applications each client asks for the same information as the other clients have just asked for. This type of application will benefit from distributed cache.

FIG. 3, application server cache management, shows that in order to find out whether digital information or data held in a local cache is valid, a query for validity information, e.g. a version number, may be sent to the database server. First, the client sends a query to the application server for data, step 301. The application server looks in its own cache to see whether the requested data are in the cache, step 302. If data are not held in the application server cache, a query for the data is sent to the database server, step 306. When the application server receives the query result, a copy of the received data is put in the application server cache, step 307, and the query result is sent to the requesting client. If the query result is already held in the application server cache, the application server sends a request for the current query result version number to the database server, step 303. The version number returned to the application server is compared with the version number already held in the application server cache, step 304. If the query result held in the application server cache is not valid, a query for updated data is sent to the database, step 306. If data in the application server cache are still valid, the requested data are sent to the client, step 308.

FIG. 4 illustrates how to compare validity information or query result version numbers according to the invention. The figure shows an algorithm used to compare a version number fetched from the database server holding structured data information with a validity number of the corresponding data held in a local cache memory. In the shown embodiment, the validity information is an array of version numbers in which every array element corresponds to a set of supersets. The database server updates each element in the array of version numbers only when one or more data elements in the database corresponding to that particular query are updated. The described algorithm compares each element in the query result version number array fetched from the database with the same element in the query result version number array held in the local cache. Version control implemented in the database server using the query result version number array means that the above method comparing the elements one by one will abort as soon as two compared elements are the same. If two compared elements are identical, data in the local cache are valid. Therefore, in a preferred embodiment of the invention, any remaining elements will not be compared.

The comparing algorithm starts by fetching the query result version array from the application server, step 401, and the query result version array from the database server, step 402. The first elements from each of the two version arrays are compared, step 403. If the two compared elements are the same, step 405, the cache is valid and the query result held in cache may be sent to the client, step 407. If the two compared elements are not the same, step 405, the algorithm looks for further elements in the query result version array, step 406. If there are any elements left to compare, the two elements in the next position are compared, step 404. It there are no elements left to compare, step 406, and there have been no matching elements, the cache is not valid, and a query for updated data is sent to the database server, step 408.

The validity of cached query results may be determined by comparing version numbers for every parameter (e.g. country, category, and date) instead of a version number/time stamp for the complete query. This reduces the number of version numbers to control—in the case of N parameters and M values per parameter, the traditional method requires $M^N$ cache entries, whereas the invention uses M*N values.

The method according to the invention works as follows: It we assume a database with prices for products in different countries, categories and valid for different days, there will be a version number for every parameter, e.g. version number '13' for "Denmark", version number '15' for "cars" and version number '17' for the "$1^{st}$ of July". When a client requests the above price information, it is given the above version numbers. When any information is changed, e.g. the car prices for "France" are revised for the "$1^{st}$ of July", the version numbers are incremented by one, e.g. '16' for "cars" and '18' for "$1^{st}$ of July". The version number for "France" is increased from '20' to '21'. The version number for "Denmark", i.e. '13', remains unchanged. When a client requests the prices for "Denmark", "cars" and the "$1^{st}$ of July", it will sent the previously received version numbers ('13', '15', '17') which will then be compared to the actual version numbers ('13', '16', '18'). Because one of the version numbers is unchanged ('13' for "Denmark"), no new data need to be transmitted. When a client requests data for "France", "cars" and the "$1^{st}$ of July", all version numbers are changed (because "France" had been incremented from '20' to '21') and thus new data will be transmitted. For 50 countries, 100 product categories and 100 dates, the cache would traditionally contain up to 50*100*100=500,000 entries. Generally, N parameters and M values per parameter result in $M^N$ cache entries. Using this invention, 50+100+100=250 entries are required (N*M entries). In some cases data are required, even though they are unchanged. If we assumed that on top of the above update for current prices for "cars" in "France", future data were updated for "Denmark", all three version numbers would be updated for a request for actual Danish prices. In this situation, current data for "cars" in "Denmark" would be required, even though they are not changed. The next time these data are needed, the new data and the new version numbers are cached locally. This limitation affects updates in different dimensions (parameters), i.e. the algorithm works best when updates affect the same dimensions. In the shown example, "Denmark", "cars" and "$1^{st}$ of July" are the supersets used. These overlapping supersets have the data of interest as a common subset, i.e. data including both "Denmark", "cars" and "$1^{st}$ of July". This is illustrated in FIGS. 6A and 6B.

FIG. 6A illustrates a set of digital information contained in cache means connected to an information source. The set 601a contains a number of items or elements 605a. According to the prior art, the validity of these elements 605a can be checked by comparing validity information associated with each of the elements 605a or the given set of elements 601a with validity information associated with the corresponding digital information in the information source.

According to the invention, two or more overlapping supersets 602b, 603b, 604b having the set of digital information 601b as a common subset are specified. One or more of these supersets 602b, 603b, 604b will typically include elements 606b, 607b, 608b not included in the given set of information or common subset 601b. A validity check is performed by comparing validity information associated with one or more of the specified supersets 602b, 603b, 604b in the cache means and validity information associated with the corresponding supersets 602b, 603b, 604b may correspond to "Denmark", "cars" and "$1^{st}$ of July", respectively. Furthermore, it is noted that the supersets 602b, 603b, 604b are not necessarily located in the cache means, but that only validity information related to the supersets 602b, 603b, 604b when the cache was last updated—is stored.

The query parameters need not necessarily reflect the way the data are stored in the database, e.g. there need not necessarily be a record in the database corresponding to the "$1^{st}$ of July". Since the price for one item is identical for many days, e.g. all days within a year, the data can be stored internally once per new price period, rather than having to be stored once per day. There could be a record stating that a price list becomes effective on January $1^{st}$. The version numbers would then be stored once for every possible query parameter, e.g. July $1^{st}$ Once a new price list is put in place, all version numbers starting from the first effective day would be incremented.

As changes typically affect some parameters with a higher probability than others, the version comparison can be optimized by starting the comparison using the parameter with the least probability of change, e.g. starting with the parameter "country", provided that data are changed on a country by country basis. The parameter with the least probability of change would be the date when changes typically affect the future, whilst most often, today's date is queried. In a preferred embodiment the supersets to be used in the validity check are selected from said specified supersets on the basis of a priori knowledge of supersets least likely to be updated. That is, the supersets least likely to be updated are designated when the application is designed.

It is noted that the supersets to be used for said validity check may also be selected from said specified supersets on the basis of obtained knowledge of supersets having been updated least frequently. That is, the application is designed to automatically rank the supersets in order to find the supersets updated least frequently. Based on this, the optimum prioritised order may be changed at given intervals.

When requesting the same query with the same set of parameters, yet with some parameter values varying, the requesting node does not have to check version numbers of the varying parameters, as long as there is one common parameter value where the version number did not change. In the above example, when the client determines that the version number for "Denmark" (13) did not change, all previously received data for "Denmark" which were received with version 13, can be retrieved from the cache, regardless of category and date.

The above methods can be used both on the application server and the client—in fact, they can be used on an unlimited chain of nodes requesting data from each other.

In most cases, the most effective definition of supersets is achieved by using orthogonal dimensions for the parameters describing the query result information. In this context, orthogonal dimensions describe the fact that a change of one parameter (one dimension) is not related to the other parameter (the other dimension). For example, when using "country" and "category" as parameters, typically all countries include all categories, thus a change of the value for "country" does not a priori reduce the amount of information found for the parameter "category".

There are cases though, where the dimensions used describe grossly or totally overlapping supersets. For example, when one parameter is "category" and the other is "usage", most elements found in category "cars" are found in usage "person transport". Likewise, when changing to another category, e.g. "buildings", there is no longer any overlap with the usage "person transport". Even when the parameters chosen are not optimal, the method still effectively reduces validity information.

In extreme cases, one dimension is completely contained in the other, e.g. country ("Denmark") is contained within continent ("Europe"). Thus, when validity information for "Denmark" is changed, the validity information for Europe will be changed. This is still useful, as we can start checking validity information on the more general dimension and only need to retrieve validity information on the more specific dimension when the more general information has been invalidated.

It is noted that the method may be implemented in a separate, transparent, self-contained program layer that is used by other programs which do not exploit the internals of the separate layer (middleware).

FIG. 5 shows an apparatus according to the invention, i.e. an apparatus 500 for retrieving digital information from an information source 506 having cache means 507 connected thereto. The apparatus 500 comprises input means 501 adapted to receive a query specifying the digital information to be retrieved, and checking means 502 adapted to check whether said cache means holds query result information associated with said query, and in the affirmative performing a validity check of said query result information. The apparatus 500 also includes updating means 503 adapted, if said cache means does not hold valid query result information associated with said query, to retrieve valid query result information from said information source 506 and to update said cache means 507 with said retried valid query result information. Further, the apparatus 500 includes output means 504 adapted to present said valid query result information as a result of said query. In the shown embodiment, the apparatus is controlled by a control unit 505 such as a central processing unit or a CPU which is connected to the input means 501, the checking means 502, the updating means 503, and/or the output means 504.

The checking means 502, which is connected to said cache means 507 and said information source 506, is adapted to specify two or more overlapping supersets of information having query result information associated with said query as a common subset; and to perform said validity check by comparing validity information associated with one or more supersets in said cache means and validity information associated with corresponding supersets in said information source. The checking means 502 is adapted to identify query result information in a common subset as valid when at least one of said supersets is valid. The checking means 502 is also adapted to select said one or more supersets to be used for said validity check from said specified supersets on the basis of a priori knowledge of supersets least likely to be updated. As described above, the checking means could also be adapted to select said one or more supersets to be used for said validity check from said specified supersets on the basis of obtained knowledge of supersets having been updated least frequently, if desired.

In FIG. 5 the information source 506 and the cache means 503 are both located outside the apparatus. But it should be stressed that they could have been located inside the apparatus as well. Likewise one or more of the elements 501, 502, 503, 504 and 504 can also be located outside the apparatus, if desired.

Some preferred embodiments of the invention have been shown in the foregoing, but it should be stressed that the invention is not limited to these, but may be embodied in other ways within the subject-matter defined in the following claims. That is, although the invention has been described in relation to client-server systems, it is not limited thereto but can be used in general when checking the validity of a set of digital information contained in cache means connected to an information source and in connection with retrieving digital information from an information source having cache means connected thereto. For example, the invention can be used when downloading a web page to a computer. Without this invention, loading the page will result in one request for every element (picture, button, page, etc.) on the page. Using this invention, every page element would be controlled by a version number for the two parameters, page number and element number (version descriptor). Whenever an element gets updated, e.g. a button picture, all version descriptors would be incremented, i.e. all version numbers for the affected pages would be incremented. When loading a page not affected, the version number of the page number would be identical to the last time it was loaded, thus retrieving all page elements from the cache. This incurs a certain overhead on updates, as all affected pages would need to have the version number incremented, yet it saves one network roundtrip per element used for checking changes. Given the fact that for a piece of information exposed on the World Wide Web, there are typically several thousand queries between two updates, the resources used in total are substantially reduced.

What is claimed is:

1. A method of checking the validity of a set of digital information contained in cache means connected to an information source by comparing validity information associated with said set of digital information and validity information associated with corresponding digital information in said information source, characterized by specifying two or more overlapping supersets of information having said set of digital information as a common subset; and performing said validity check by comparing validity information associated with one or more of said supersets in said cache means and validity information associated with corresponding supersets in said information source.

2. A method according to claim 1, characterized in that said set of digital information is identified as valid when at least one of said supersets is valid.

3. A method according to claim 2, characterized in that said one or more supersets to be used for said validity check are selected from said specified supersets on the basis of a priori knowledge of supersets least likely to be updated.

4. A method according to claim 2, characterized in that said one or more supersets to be used for said validity check are selected from said specified supersets on the basis of obtained knowledge of supersets having been updated least frequently.

5. A method of retrieving digital information from an information source having cache means connected thereto, said method comprising the steps of;

receiving a query specifying the digital information to be retrieved;

checking whether said cache means holds query result information associated with said query, and in the affirmative performing a validity check of said query result information;

retrieving, if said cache means does not hold valid query result information associated with said query, valid query result information from said information source and updating said cache Leans with said retried valid query result information; and presenting said valid query result information as a result of said query, characterized in that said checking includes specifying two or more overlapping supersets of information having query result information associated with said query as a common subset; and said validity check is performed by comparing validity information associated with one or more of said supersets in said cache means and validity information associated with corresponding supersets in said information source.

6. A method according to claim 5, characterized in that query result information in a common subset is identified as valid when at least one of said supersets is valid.

7. A method according to claim 6, characterized in that said one or more supersets to be used for said validity check are selected among said specified supersets on the basis of a priori knowledge of supersets least likely to be updated.

8. A method according to claim 6, characterized in that said one or more supersets to be used for said validity check are selected from said specified supersets on the basis of obtained knowledge of supersets having been updated least frequently.

9. An apparatus for retrieving digital information from an information source having cache means connected thereto, said apparatus comprising:

input means adapted to receive a query specifying the digital information to be retrieved;

checking means adapted to check if said cache means holds query result information associated with said query, and in the affirmative performing a validity check of said query result information;

updating means adapted, whether said cache means does not hold valid query result information associated with said query, to retrieve valid query result information from said information source and to update said cache means with said retrieved valid query result information; and output means adapted to present said valid query result information as a result of said query characterized in that said checking means is adapted to specify two or more overlapping supersets of information having query result information associated with said query as a common subset; and to perform said validity check by comparing validity information associated with one or more supersets in said cache means and validity information associated with corresponding supersets in said information source.

10. An apparatus according to claim 9 characterized in that said checking means is adapted to identify query result information in a common subset as valid when at least one of said supersets is valid.

11. An apparatus according to claim 10, characterized in that said checking means is adapted to select said one or more supersets to be used for said validity check from said specified supersets on the basis of a priori knowledge of supersets least likely to be updated.

12. An apparatus according to claim 10, characterized in that said checking means is adapted to select said one or more supersets to be used for said validity check from said specified supersets on the basis of obtained knowledge of supersets having been updated least frequently.

* * * * *